United States Patent

Ogoshi et al.

[11] Patent Number: 5,883,987
[45] Date of Patent: *Mar. 16, 1999

[54] IMAGE SENSING SYSTEM INCLUDING A LIGHT SOURCE

[75] Inventors: Takeshi Ogoshi, Amagasaki; Tetsuyuki Tanimoto, Takatsuki; Atsuhiro Noda, Itami; Takeshi Ono, Ikoma; Katsuyuki Nanba, Sakai, all of Japan

[73] Assignee: Minolta Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 471,370

[22] Filed: Jun. 6, 1995

[30] Foreign Application Priority Data

Jun. 8, 1994 [JP] Japan ................... 6-126096

[51] Int. Cl.⁶ ........................................... G06K 7/00
[52] U.S. Cl. .................. 382/312; 382/274; 382/319; 382/321; 348/104; 348/266
[58] Field of Search .................. 382/312, 319, 382/321, 274; 348/68, 96, 195, 221, 266, 104; 355/83; 356/474, 475; 362/4, 5, 260, 321; 386/4, 117

[56] References Cited

U.S. PATENT DOCUMENTS 4,495,516  1/1985  Moore et al. ................. 358/54
4,691,365  9/1987  Nagashima ................... 382/54

FOREIGN PATENT DOCUMENTS

S60-10872  1/1985  Japan ................. H04N 1/04
1542659    3/1979  United Kingdom ........... G03B 27/32

Primary Examiner—Jose L. Couso
Assistant Examiner—Anh Hong Do
Attorney, Agent, or Firm—Sidley & Austin

[57] ABSTRACT

An image sensing system is provided with a fluorescent lamp which performs AC lighting to irradiate an object, an inverter power source which supplies currents to the fluorescent lamp, a lighting frequency changing circuit which changes the frequency of the current supply, a lens which images an image onto a film, and a CCD image sensing device which is capable of changing the period of exposure by the formed image and which outputs the image of the object as an electric signal through photoelectric conversion. The exposure period of the CCD image sensing device is controlled by a microcomputer and a timing generator. The lighting frequency changing circuit is controlled so that the phase of the exposure period and the phase of the current supply to the fluorescent lamp are in synchronism with each other.

14 Claims, 11 Drawing Sheets

IMAGE SENSING SYSTEM INCLUDING A LIGHT SOURCE

BACKGROUND OF THE INVENTION

1. Field of the Invention

The present invention relates to an image sensing system including a light source, and more specifically, to an image sensing system such as an image scanner including a light source.

2. Description of the Prior Art

An image sensing system using a light source (chiefly, a fluorescent lamp) of a type which performs AC lighting and a solid-state image sensing device which accumulates charges for a predetermined period of time to output signals in time sequence presents a problem in that the output signal is unstable. This is because the charge accumulation amount of the solid-state image sensing device is not constant due to the non-uniformity of the lighting by the light source.

In an image sensing system such as a scanner including a light source shown in U.S. Pat. No. 4,691,365, since the selection of a light source can be made, even when a fluorescent lamp is used, this problem can be solved by increasing the lighting frequency (i.e. by using an inverter type fluorescent lamp).

Referring now to a block diagram of FIG. 1, a conventional image sensing system including a light source will be described. This conventional system is a film scanner including a fluorescent lamp 1, an inverter power source 2, a film holder 3, a lens 5, a CCD (change coupled device) image sensing device 6, a timing generator 7, a microcomputer 9 and a processing circuit 12.

The fluorescent lamp 1 is driven by the inverter power source 2 and irradiates light to a film 4 attached to the film holder 3. Also, the fluorescent lamp 1 performs self-excited oscillation for the lighting so as to operate independently of the system. The light transmitted by the film 4 is condensed by the lens 5 and formed into an image on a cell surface of the CCD image sensing device 6. The CCD image sensing device 6 performs photoelectric conversion according to a pulse supplied from the timing generator 7 and outputs an electric signal in accordance with the formed image. The signal outputted from the CCD image sensing device 6 is processed as a video signal by the processing circuit 12 and outputted to an external apparatus (not shown). To obtain a two-dimensional image of the film 4, the film 4 is moved by a motor 8 vertically to the line of pixels of the CCD image sensing device 6.

The level of the output signal of the CCD image sensing device 6 varies according to the depth of the image of the film 4. Since the level of the video signal of the processing circuit 12 varies if the level of the output signal of the CCD image sensing device 6 varies, it is necessary to perform exposure control. In this conventional system, a so-called electronic shutter is provided where the CCD image sensing device 6 is capable of changing the exposure period based on a control signal from an external apparatus and the microcomputer 9 controls the exposure period of the CCD image sensing device 6 to perform exposure control. That is, since the level of the video signal supplied from the processing circuit 12 varies according to the depth of the image of the film 4, the microcomputer 9 detects the level of the output of the processing circuit 12 and controls a timing pulse outputted from the timing generator 7 based on the detection output to control the exposure period of the CCD image sensing device 6. Thus, in the recent image sensing system, exposure control is performed by changing the exposure period (i.e. signal charge accumulation period) of the solid state image sensing device by the electronic shutter without using any mechanical aperture stop or ND filter.

FIGS. 2 and 3 show correspondence relationships among the exposure period of the CCD image sensing device 6, the lighting pulse (current waveform from the inverter power source 2) of the fluorescent lamp 1 and the output signal of the CCD image sensing device 6 when normal exposure is performed (FIG. 2) and when the exposure period is controlled (i.e. when the electronic shutter is used) (FIG. 3). In this case, it is assumed that the film 4 transmits light uniformly, and the shading of the fluorescent lamp 1 serving as a light source, the lens 5, etc. is not considered.

In FIG. 2, the integration values of the lighting pulses of the fluorescent lamp 1 shown by hatched portions a, b and c correspond to the charge accumulation amounts in exposure periods $e_1$, $e_2$ and $e_3$ ($e_1=e_2=e_3$) and correspond to the level of the output signal of the CCD image sensing device 6. In FIG. 3, the integration values of the lighting pulses of the fluorescent lamp 1 shown by hatched portions a', b' and c' correspond to the change accumulation amount in exposure periods $E_1$, $E_2$ and $E_3$ ($E_1=E_2=E_3$) and correspond to the level of the signal of the CCD image sensing device 6 outputted at that time. The periods $e_1$, $e_2$ and $e_3$ and the periods $E_1$, $E_2$ and $E_3$ are also electronic shutter periods.

Pulses $P_1$, $P_2$, $P_3$, . . . in FIG. 3 are timing pulses for the electronic shutter of the CCD image sensing device 6. The electronic shutter is activated in the periods from the fall of the pulses $P_1$, $P_3$, $P_5$, . . . , and $P_{2n+1}$ to the rise of the next pulses $P_2$, $P_4$, $P_6$, . . . , and $P_{2n}$ (exposure period), and the electronic shutter is deactivated in other periods (non-exposure period). The pulses $P_1$, $P_3$, $P_5$, . . . , and $P_{2n+1}$ are also used as shift gate pulses (pulses for supplying the charges accumulated by a charge accumulator of the CCD image sensing device 6 to a transferring unit).

When a number of lighting pulses are present in one exposure period as shown in FIG. 2, even if there is a difference in phases of the lighting pulses among exposure periods $e_1$, $e_2$ and $e_3$, the difference in integration values of the lighting pulses among the exposure periods is substantially zero (a=b=c), so that the level of the output signal of the CCD image sensing device 6 is substantially constant.

However, when the exposure period is reduced by performing the exposure control by the electronic shutter as described above, the number of lighting pulses in one exposure periods decreases. In this case, if there is a difference between the phase of the lighting pulse and the phase of exposure, the integration values of the lighting pulses differ among the exposure periods $E_1$, $E_2$ and $E_3$ (a'≠b'≠c') as shown in FIG. 3, so that the level of the output signal of the CCD image sensing device 6 varies. The variation in level of the output signal causes non-uniformity or longitudinal stripes in the image. Such a problem may be solved by further increasing the lighting frequency of the fluorescent lamp 1 as described above. However, the increase in lighting frequency has its limit in view of the cost.

SUMMARY OF THE INVENTION

An object of the present invention is to provide an image sensing system including a light source capable of obtaining a stable output signal irrespective of the length of the period of exposure by an electronic shutter.

To achieve the above-mentioned object, an image sensing system of the present invention is provided with a light source which performs alternating current lighting to irradiate an original, an inverter power source which supplies an alternating current to the light source, an image sensing device which performs image sensing of light irradiated by the light source, detecting means for detecting a lighting period of the light source, processing means for processing an image signal transmitted from the image sensing device, and controlling means for controlling a processing timing of the processing means based on a detection signal from the detecting means.

According to such features, even if the exposure period is reduced by the use of an electronic shutter, the integration values of lighting pulses in the exposure periods are the same.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
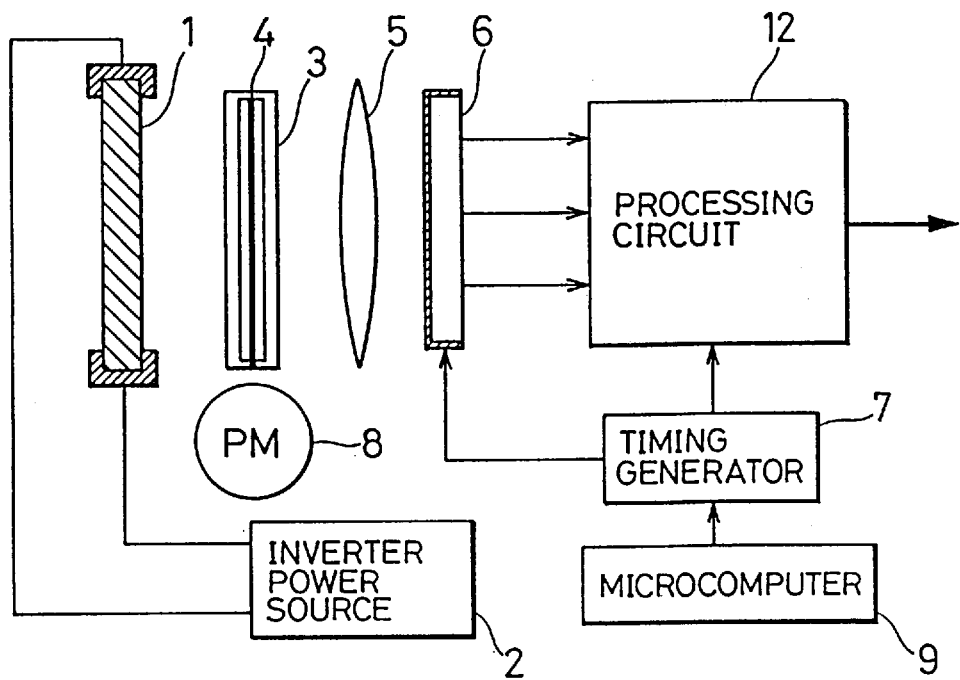
FIG. 1 is a block diagram schematically showing the arrangement of a conventional system.
Figure 2:
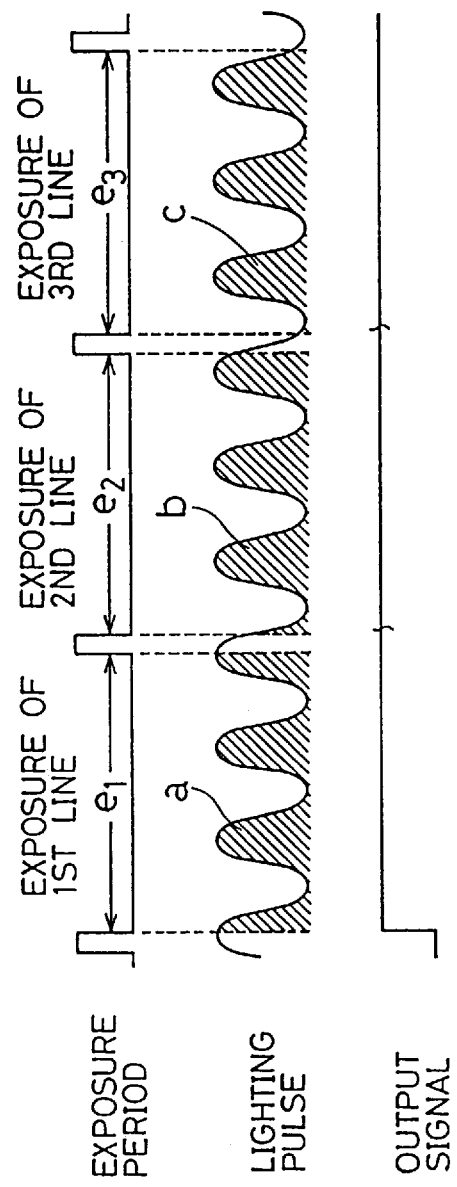
FIG. 2 shows a correspondence relationship between a period of a lighting pulse of a fluorescent lamp and an output value of a CCD image sensing device in each one line exposure period when normal exposure is performed in the conventional system of FIG. 1.
Figure 4:
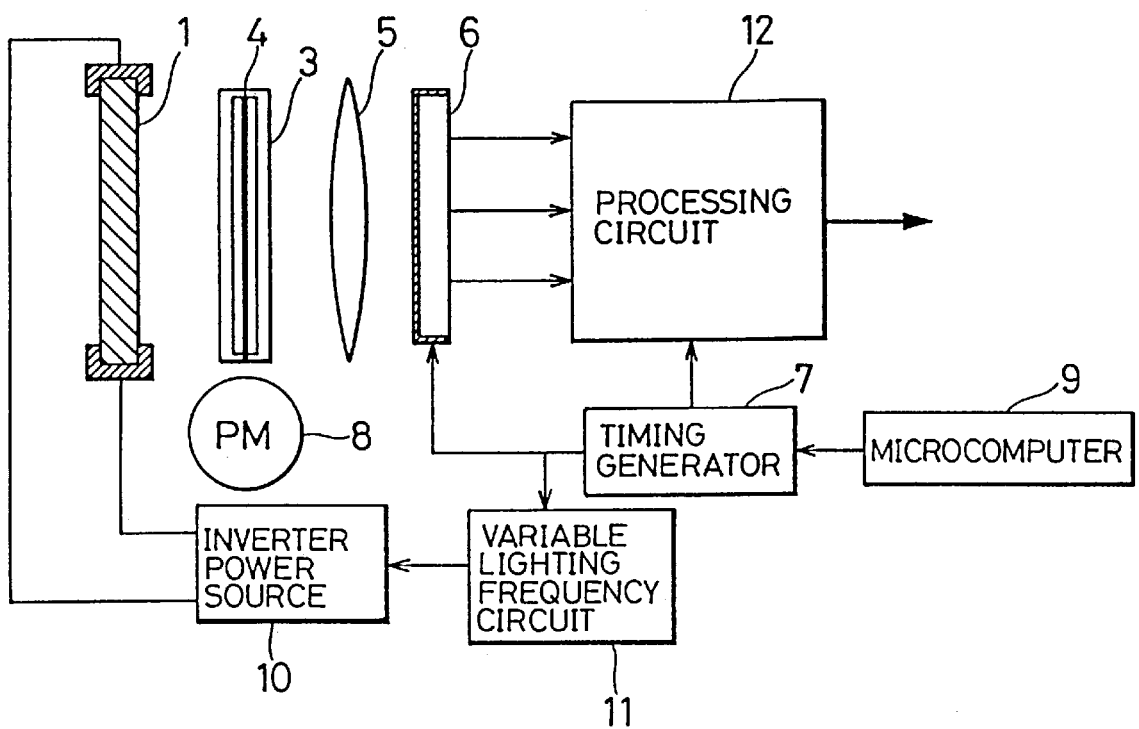
FIG. 4 is a block diagram schematically showing the arrangement of a first embodiment of the present invention.

Hereinafter, embodiments of the present invention will be described with reference to the drawings. FIG. 4 is a block diagram schematically showing the arrangement of a first embodiment of the present invention. The same components and portions as those of the conventional system of FIG. 1 are identified by the same reference designations.

This embodiment is a film scanner including a fluorescent lamp 1, a film holder 3, a lens 5, a CCD image sensing device 6, a timing generator 7, a microcomputer 9, an inverter power source 10, a lighting frequency changing circuit 11 and a processing circuit 12.

The inverter power source 10 supplies currents for turning on the fluorescent lamp 1 which irradiates a film 4 by performing AC lighting. The lens 5 images an image of the film 4 irradiated by the fluorescent lamp 1. The CCD image sensing device 6 is capable of changing the period of exposure by the light imaged by the lens 5 and outputs the image of the film 4 as an electric signal through photoelectric conversion. The exposure period of the CCD image sensing device 6 is controlled by the timing generator 7, the microcomputer 9 and the processing circuit 12.

This embodiment is characterized in that the lighting frequency changing circuit 11 which changes the frequency of the current supply from the inverter power source 10 to the fluorescent lamp 1 is provided to control the lighting frequency by using an output pulse of the timing generator 7 so that the phase of the exposure period and the phase of the current supplied to the fluorescent lamp 1 are in synchronism with each other.

Figure 7:
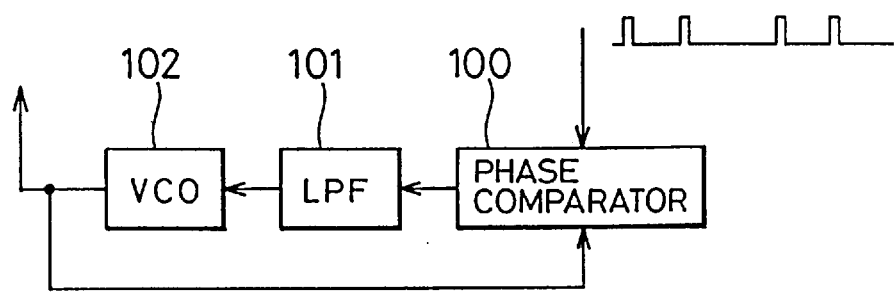
FIG. 7 is a block diagram showing an arrangement for phase synchronization employable for the first embodiment.

Referring to FIG. 7, there is shown an example of an arrangement where the lighting frequency is controlled by the lighting frequency changing circuit 11 so that the phase of the exposure period and the phase of the current supplied to the fluorescent lamp 1 are in synchronism with each other. According to this arrangement, the phase of the output of a voltage controlled oscillator (VCO) 102 provided in the inverter power source 10 is compared with the phase of the shift gate pulse by a phase comparator 100, and the comparison output is supplied to the VCO 102 through a low-pass filter (LPF) 101 to thereby synchronize the oscillation frequency of the VCO 102 with the shift gate pulses.

Figure 5:
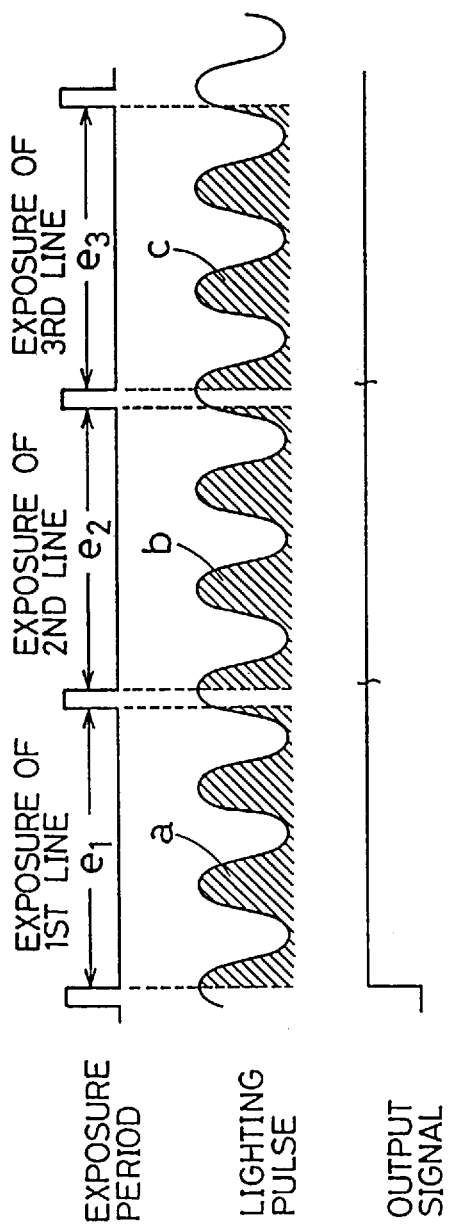
FIG. 5 shows a correspondence relationship between a period of a lighting pulse of a fluorescent lamp and an output value of a CCD image sensing device in each one line exposure period when normal exposure is performed in the first embodiment.
Figure 6:
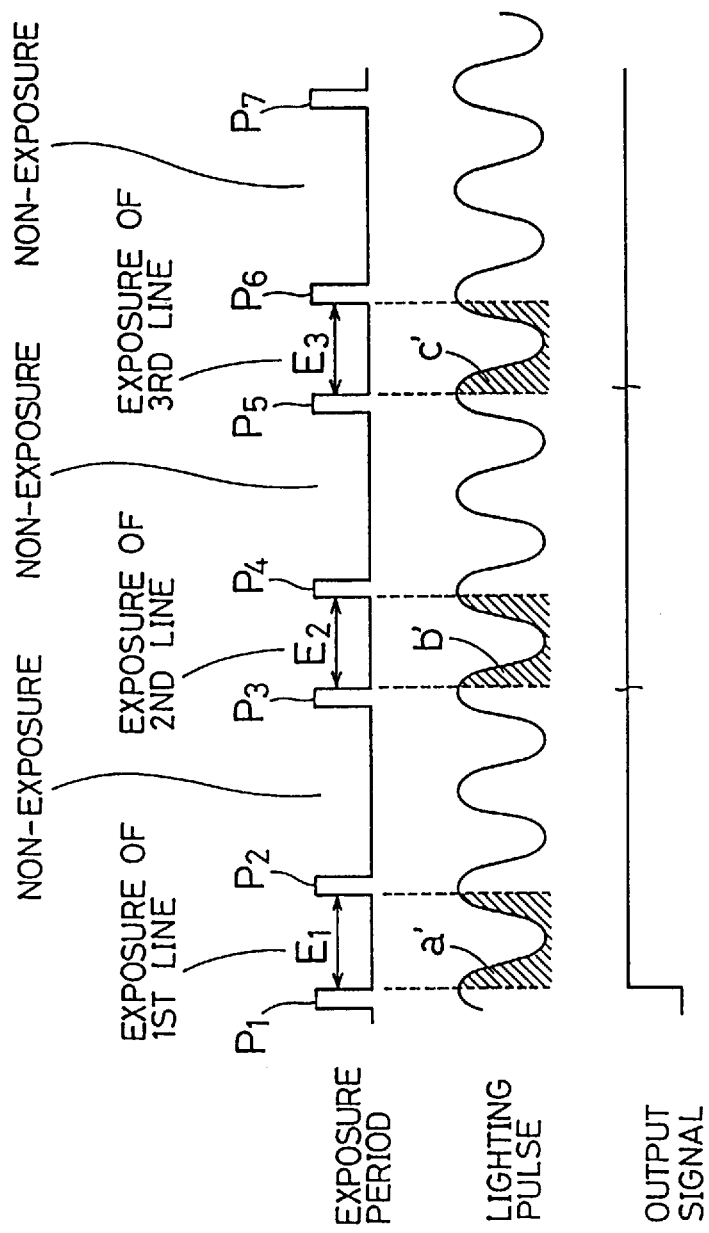
FIG. 6 shows a correspondence relationship between the period of the lighting pulse of the fluorescent lamp and the output value of the CCD image sensing device in each one line exposure period when the exposure period is controlled in the first embodiment.

Like FIGS. 2 and 3, FIGS. 5 and 6 show correspondence relationships among the exposure period of the CCD image sensing device 6, the lighting pulse (current waveform from the inverter power source 2) of the fluorescent lamp 1 and the output signal of the CCD image sensing device 6 when normal exposure is performed (FIG. 5) and when the exposure period is controlled (i.e. when the electronic shutter is used) (FIG. 6). In FIG. 5, the integration values of the lighting pulses of the fluorescent lamp 1 shown by hatched portions a, b and c correspond to the charge accumulation amounts in exposure periods $e_1$, $e_2$ and $e_3$ ($e_1=e_2=e_3$) and correspond to the level of the output signal of the CCD image sensing device 6. In FIG. 6, the integration values of the lighting pulses of the fluorescent lamp 1 shown by hatched portions a', b' and c' correspond to the charge accumulation amount in exposure periods $E_1$, $E_2$ and $E_3$ ($E_1=E_2=E_3$) and correspond to the level of the output signal of the CCD image sensing device 6.

When a number of lighting pulses are present in one exposure period as shown in FIG. 5, there is no difference in phases of the lighting pulses among the exposure periods $e_1$, $e_2$ and $e_3$, so that the integration values of the lighting pulses in the exposure periods are the same (a=b=c). As a result, the level of the output signal of the CCD image sensing device 6 is constant.

Figure 3:
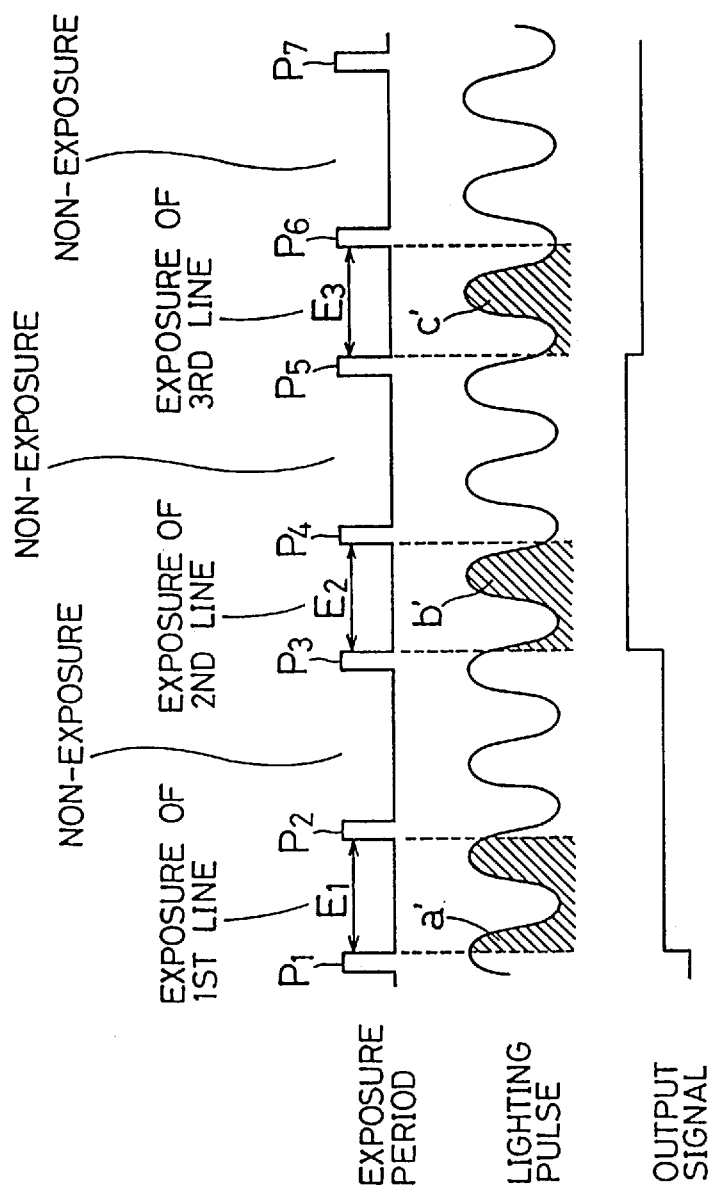
FIG. 3 shows a correspondence relationship between the period of the lighting pulse of the fluorescent lamp and the output value of the CCD image sensing device in each one line exposure period when the exposure period is controlled in the conventional system of FIG. 1.

Further, as is understood from the comparison between FIGS. 3 and 6, even if the exposure period is reduced by performing the exposure control by the electronic shutter, since there is no difference between the phase of the lighting pulse and the phase of the exposure as shown in FIG. 6, the integration values of the lighting pulses in the exposure periods $E_1$, $E_2$ and $E_3$ are the same (a'=b'=c'). As a result, the level of the output signal of the CCD image sensing device 6 is constant irrespective of the length of the exposure period.

As described above, by controlling the lighting frequency changing circuit 11 to change the frequency of the current supply to the fluorescent lamp 1 so that the phase of the exposure period and the phase of the current supplied to the fluorescent lamp 1 are in synchronism with each other (i.e. so that the oscillation clock of the inverter power source 1 is synchronized with the exposure timing of the CCD image sensing device 6), even if the exposure period is reduced by the use of the electronic shutter, the integration values of the lighting pulses in the exposure periods are the same, so that a stable output signal is obtained. As a result, the generation of non-uniformity and longitudinal stripes in the image is prevented.

By performing the above-described control, the fluorescent lamp 1 can be selected without any need to consider the lighting frequency, so that the other performance (the life at the time of high frequency lighting, etc.) of the fluorescent lamp 1 can be improved. As a result, the cost is reduced. In addition, while the lighting frequency is increased to avoid the bad influence of the AC lighting of the fluorescent lamp 1 in the conventional system, according to the present invention, since there is no need to increase the lighting frequency of the fluorescent lamp 1, the increase in cost due to the increase in lighting frequency does not occur.

As described above, according to the image sensing system including a light source of the present invention, a stable output signal is obtained irrespective of the length of the period of exposure by the electronic shutter. In addition, since the fluorescent lamp can be selected without any need to consider the lighting frequency, the other performance (the life at the time of high frequency lighting, etc.) of the fluorescent lamp can be improved. As a result, the cost is reduced.

Figure 8:
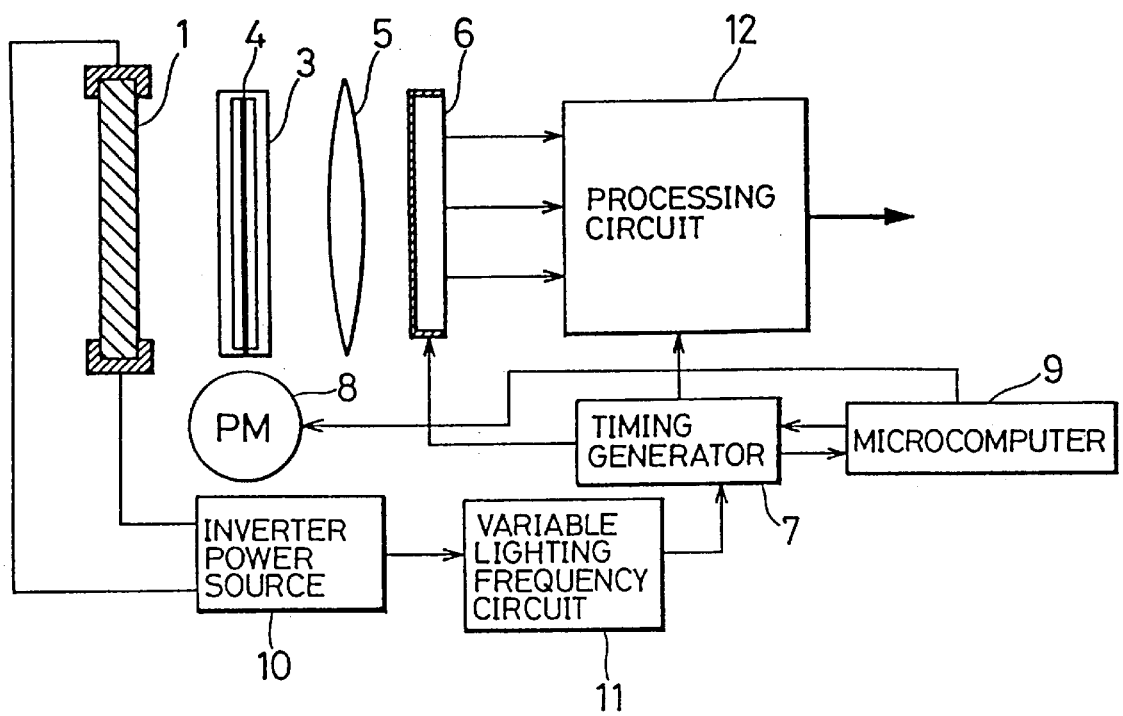
FIG. 8 is a block diagram schematically showing the arrangement of a second embodiment of the present invention.
Figure 9:
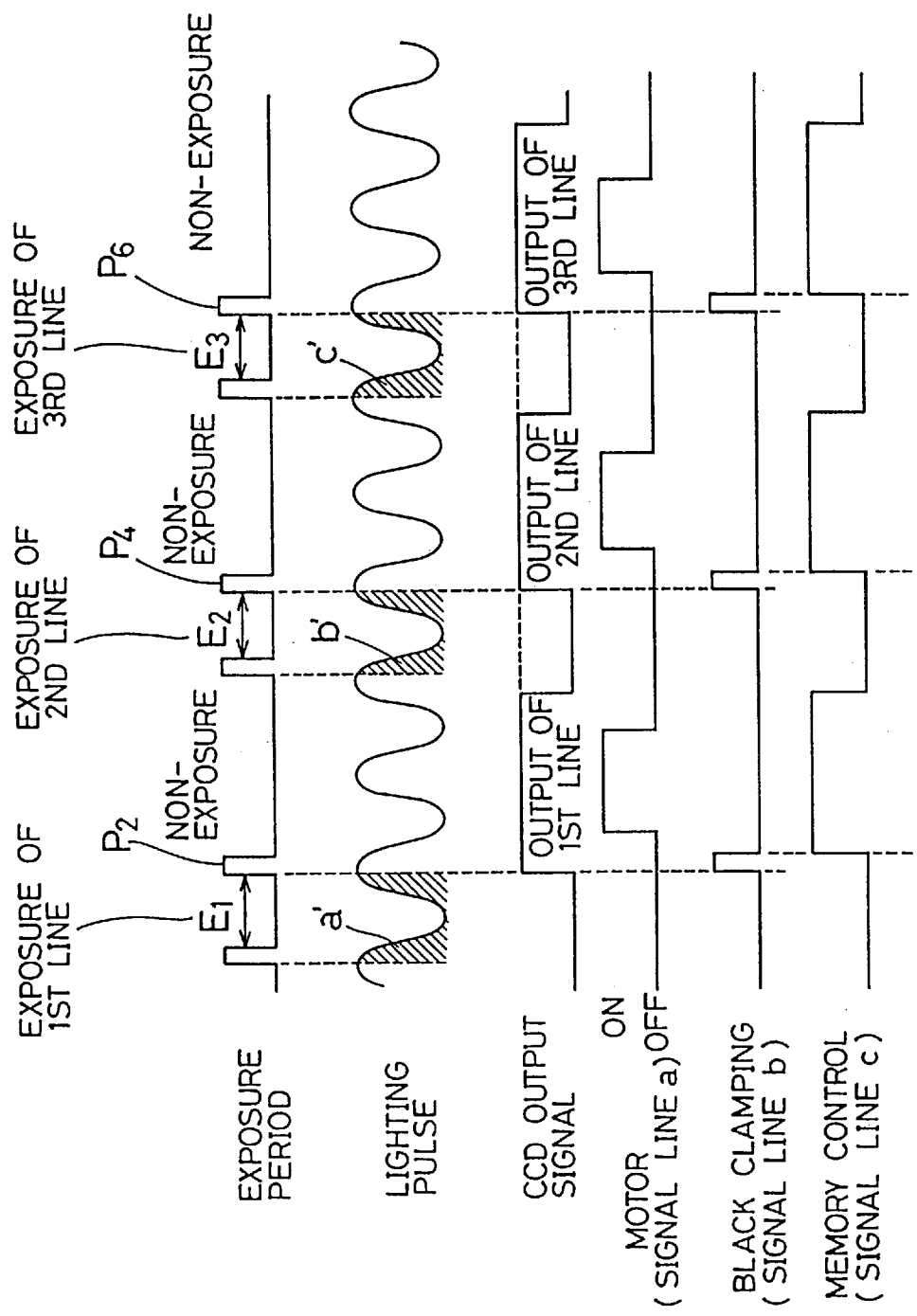
FIG. 9 shows a correspondence relationship between the period of the lighting pulse of the fluorescent lamp, the output value of the CCD image sensing device, a Motor control signal, a black control signal and a memory control signal in each one line exposure period when the exposure period is controlled in the second embodiment.
Figure 10:
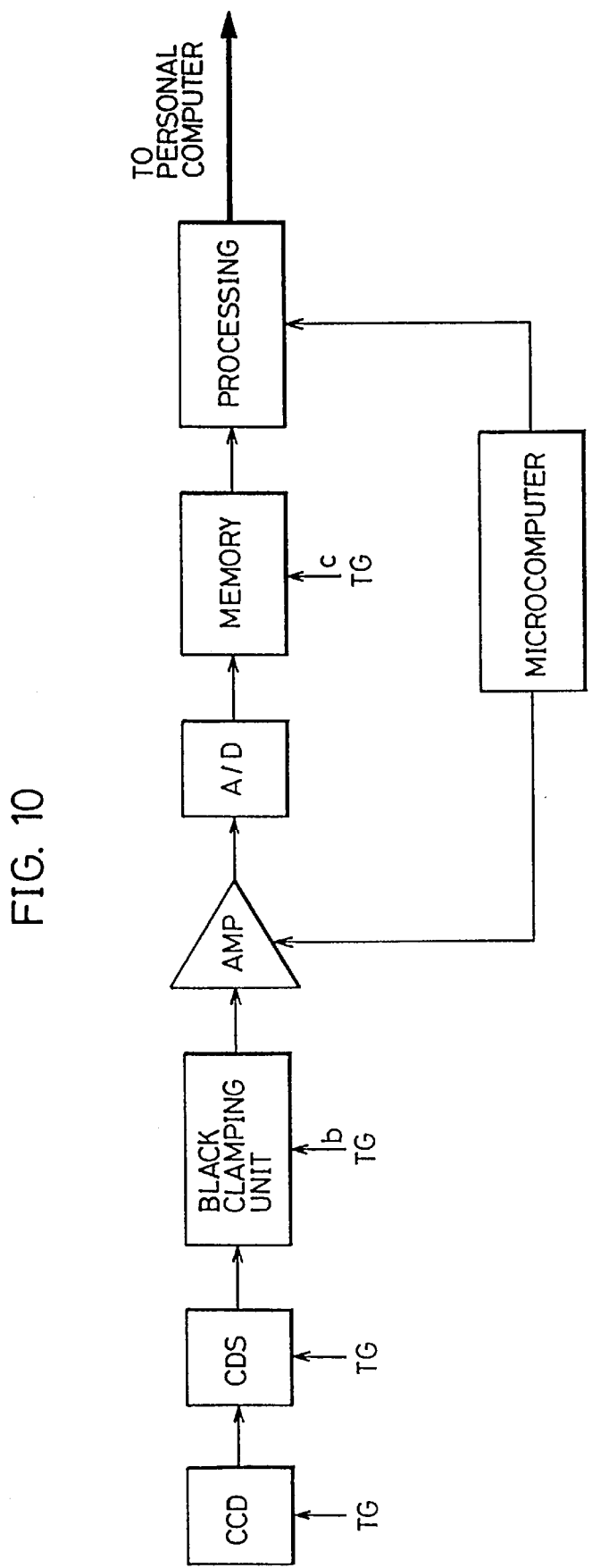
FIG. 10 is a block diagram showing the arrangement of a processing circuit of the second embodiment.

Referring to FIGS. 8 to 10, a second embodiment of the present invention will be described. In these figures, the same components and portions as those of the first embodiment are identified by the same reference designations. This embodiment is different from the first embodiment in that a phase detecting means is provided for detecting the phase of the inverter power source 10 and that when the sensing of one line is intended, after the phase of the inverter light source 10 becomes a predetermined phase, an exposure control signal is generated from the timing generator 7. The same advantages as those of the first embodiment are achieved according to this arrangement. In addition, in the second embodiment, not only the exposure timing but also the processing timings of a black clamping circuit and a memory circuit in the processing circuit 12 are synchronized. As shown in FIG. 9, after predetermined times (E1, E2 and E3) from the peaks of the lighting pulse of the fluorescent lamp detected by the phase detecting circuit, the exposure of the lines is finished by the pulses P2, P4 and P6. When the exposure is finished, a signal from the CCD image sensing device is outputted and in synchronism therewith, the black clamp and memory control is performed. In FIG. 8, a control signal (signal line a) is outputted from the microcomputer 9 to the motor 8. This signal is for transporting the film so that the image sensing of the next line is performed during non-exposure periods as shown in FIG. 9 after the exposure of the lines is finished.

Referring to FIG. 10, there is shown a block diagram of the internal arrangement of the processing circuit 12. After double-correlation-sampled and black-clamped at a CDS circuit, the output signal from the CCD is amplified and inputted to an analog-to-digital (A/D) converter circuit. The data converted into a digital format by the A/D converter is recorded in the memory and an output of the memory is processed to be adaptable for an external apparatus such as a personal computer. In this arrangement, the CDS circuit, the black clamping circuit and the memory are supplied with a signal from the timing generator.

Figure 11:
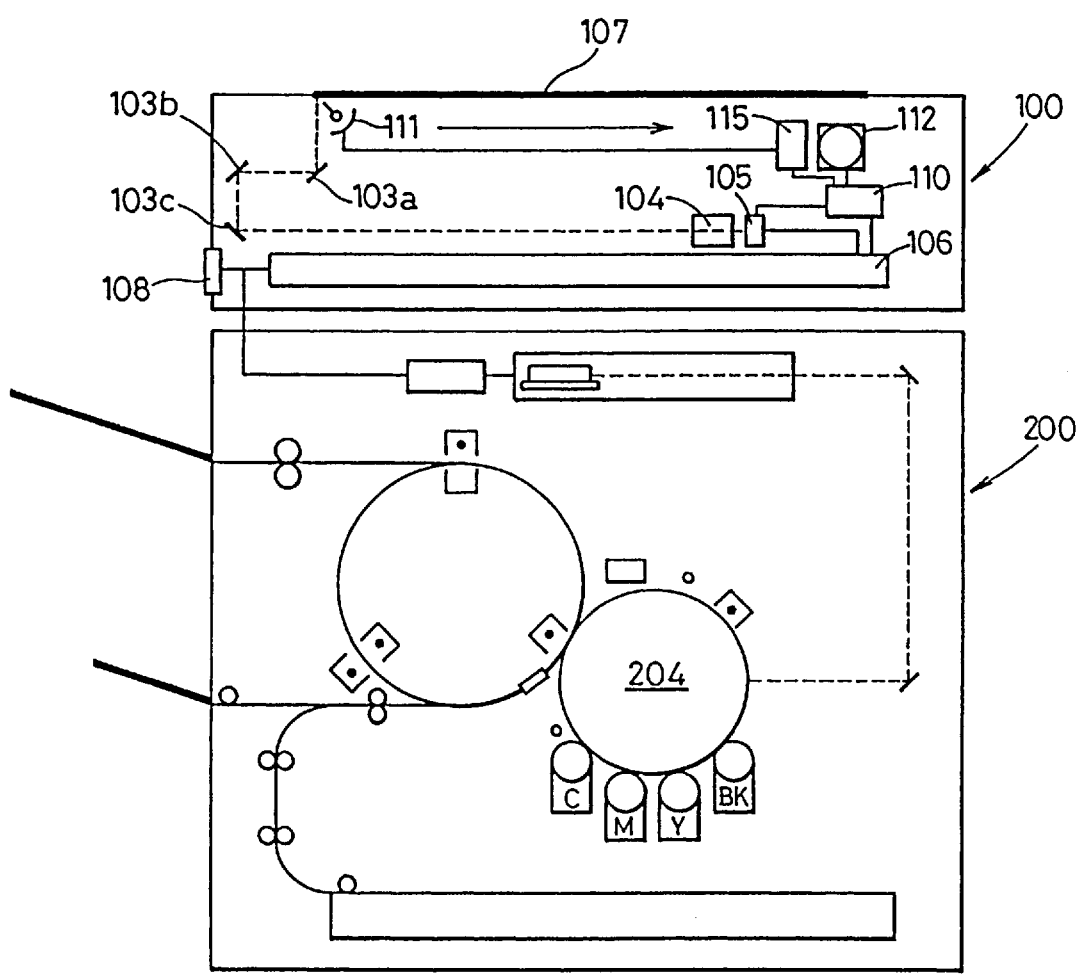
FIG. 11 is a cross-sectional view of a digital color copying machine according to a third embodiment of the present invention.

Referring to FIG. 11, there is shown a cross-sectional view showing the arrangement of a digital full color copying machine according to a third embodiment of the present invention. The digital full color copying machine is roughly divided into an image reading unit 100 which reads out red (R), green (G) and blue (B) image data of an original, and a copying unit 200.

In the image reading unit 100, an original placed on a original stand glass 107 is irradiated by a fluorescent lamp 111. The light reflected by the original is directed to a lens 104 by three mirrors 103a, 103b and 103c and formed into an image on a CCD sensor 105. The fluorescent lamp 111 and the mirror 103a are moved by a pulse motor 112 in the direction of the arrow (in the sub scanning direction) at a speed V in accordance with a set magnification. Thereby, the entire surface of the original placed on the original stand glass 107 is scanned. With the movements of the fluorescent lamp 111 and the mirror 103a in the direction of the arrow, the mirrors 103b and 103c are moved in the direction of the arrow (in the sub scanning direction) at a speed of V/2. The multivalued electric signal of three colors of R, G and B obtained by the CCD sensor 105 is converted by a reading signal processing unit 106 into an 8-bit gradation data of any of yellow (Y), magenta (M), cyan (C) and black (BK), and then outputted to an external output port 108 and to the copying unit 200.

The fluorescent lamp 111 is connected to an inverter power source 115 and turned on by an alternating current supplied from the inverter power source 115. The inverter power source 115, the pulse motor 112, the CCD sensor 105 and the reading signal processing unit 106 are connected to a control circuit 110. The control circuit 110 controls the power source 115 such that it controls the frequency of the alternating current outputted from the inverter power source 115 so that a period from the start of reading of a predetermined line to the start of reading of the next line is an integral number times the period of the alternating current outputted to the image projecting means. The driving of the pulse motor 112 is controlled, and based on its driving order, the reading timing of the CCD sensor 105 and the processing timing of the reading signal processing unit 106 are controlled.

The copying unit 200 is an electrophotographic color printer which forms electrostatic latent images by irradiating a semiconductor laser to a photoreceptor drum 204. Images are formed on sheets of paper fed from a paper feeding section by a known method.

Obviously, many modifications and variations of the present invention are possible in light of the above teachings. It is therefore to be understood that within the scope of the appended claims, the invention may be practiced other than as specifically described.

What is claimed is:

1. An image reading apparatus comprising:
   image projecting means for performing alternating current lighting to project light including image information of an original;

a power source which supplies an alternating current to the image projecting means;

an image reading member having photoelectric conversion devices arranged in a line, said image reading member reading out the image information;

a scanner which moves the original and the photoelectric conversion devices relatively to each other in a direction perpendicular to the line in which the photoelectric conversion devices are arranged; and a control circuit which controls a start timing of reading of each line by the image reading member, said control circuit controlling the power source so that a phase position of the alternating current is substantially the same for the start timing of reading of each line so that an output level of said image reading member its-substaritially the same for each line.

2. An image reading apparatus as claimed in claim 1, wherein relative movement between the original and the photoelectric conversion devices by the scanner is made by a movement of the original.

3. An image reading apparatus as claimed in claim 1, wherein said scanner includes a pulse motor, and wherein an amount of the relative movement between the original and the photoelectric conversion devices is decided by a pulse number of driving of said pulse motor, and wherein a start timing of reading of each line is controlled by the pulse number.

4. An image reading apparatus as claimed in claim 1, wherein said image projecting means has a mirror for directing the projected light to the image reading member and wherein relative movement between the original and the photoelectric conversion devices by the scanner is made by a movement of the image projecting means.

5. An image sensing apparatus comprising:

a light source which performs alternating current lighting to irradiate an original;

an inverter power source which supplies an alternating current to the light source, said inverter power source being capable of changing a period of the supplied alternating current;

an image sensing device whose exposure period is changeable, said image sensing device performing image sensing of light irradiated by the light source; and a control circuit for controlling an exposure timing and an exposure period of the image sensing device and for controlling the period of the alternating current from the inverter power source so that a phase of the exposure period of the image sensing device and a phase of said alternating current to the light source are synchronized so that an output level of said sensing device is substantially the same regardless of said exposure timing.

6. An image sensing apparatus as claimed in claim 5, wherein said control circuit controls the alternating current from the inverter power source so that the exposure period of the image sensing device coincides with one period of the alternating current for lighting the light source.

7. An image sensing system comprising:

a light source which performs alternating current lighting to irradiate an original;

an inverter power source which supplies an alternating current to the light source;

an image sensing device which performs image sensing of light irradiated by the light source;

detecting means for detecting a lighting period of the light source;

processing means for processing an image signal transmitted from the image sensing device; and controlling means for controlling a processing timing of the processing means based on a detection signal from the detecting means so that a phase of said processing timing of the processing means and a phase of said light source are synchronized so that a level of said image signal transmitted from the image sensing device for said processing does not substantially vary based on said phase of said light source.

8. An image sensing system as claimed in claim 7, wherein said processing means has an image processing circuit which converts the image signal transmitted from the image sensing device into an electric signal which can be printed out, and wherein said image sensing system has a printer for recording an image on a recording medium based on an output signal from the image processing circuit, and wherein said controlling means controls an image recording timing of the printer.

9. An image reading apparatus comprising:

a projecting optical system which performs alternating current lighting to project light including image information of a predetermined line of an original;

a power source which supplies an alternating current to the projecting optical system;

an image reading member having photoelectric conversion devices, said image reading member reading out the image information of the predetermined line projected by the photoelectric conversion devices;

a scanner which moves the original and the photoelectric conversion devices relatively to each other in a direction perpendicular to the predetermined line projected by the projecting optical system;

a sensing circuit which senses a light receiving period of the photoelectric conversion devices for reading of each line by the image reading member; and a control circuit which controls a frequency of the power source based on an output of the sensing circuit so that for reading of each line, a phase of the light receiving period of the photoelectric conversion devices and a phase of the power source have a constant phase relationship therebetween so that an output level of said image reading member is substantially the same for each line.

10. An image reading apparatus as claimed in claim 9, wherein relative movement between the original and the photoelectric conversion devices by the scanner is made by a movement of the original.

11. An image reading apparatus as claimed in claim 10, wherein said scanner includes a pulse motor, and wherein an amount of the relative movement is decided by a pulse number of driving of said pulse motor, and wherein a start timing of reading of each line is controlled by the pulse number.

12. An image reading apparatus as claimed in claim 9, wherein said control circuit controls the power source so that the light receiving period of the photoelectric conversion devices and the period of the alternating current coincide with each other.

13. An image sensing system including a light source, comprising:

a light source which irradiates an object by performing alternating current lighting;

a current supplying circuit which supplies a current to turn on the light source;

a lens which forms an image of the object irradiated by light from the light source;

an image sensing device capable of changing a period of exposure by light formed into an image by the lens, said image sensing device outputting the image of the object as an electric signal through photoelectric conversion;

an exposure period controller which controls an is exposure period of the image sensing device; and a lighting frequency controller which controls a frequency of a current supplied to the light source so that a phase of the exposure period and a phase of the lighting are synchronized by using an output of the exposure period controlling means so that a level of said electrical signal outputted by said image sensing device does not substantially depend on exposure timing.

14. A method of providing uniform exposure between lines in an image reading operation comprising the steps of:

supplying alternating current to a light source to irradiate an object;

forming an image of the object irradiated by light from the light source;

sequentially reading lines of image information in the formed image; and controlling a phase position of the alternating current supplied to the light source so that a phase position of the alternating current is substantially the same at the start timing of reading of each line of image information so that an amount of light received during is the reading of each sequential line of image information is substantially the same.

* * * * *

UNITED STATES PATENT AND TRADEMARK OFFICE
CERTIFICATE OF CORRECTION

PATENT NO. : 5,883,987
DATED : March 16, 1999
INVENTOR(S) : Ogoshi et al

It is certified that error appears in the above-identified patent and that said Letters Patent is hereby corrected as shown below:

Column 7, line 16, delete "its substaritally" and insert --is substantially--.

Column 10, line 13, delete "is".

Signed and Sealed this

Fifteenth Day of February, 2000

Attest:

Q. TODD DICKINSON

*Attesting Officer*       Commissioner of Patents and Trademarks